United States Patent [19]

Sorkoram

[11] Patent Number: 4,851,061
[45] Date of Patent: Jul. 25, 1989

[54] METHOD AND APPARATUS FOR PATTERNED CUT OF THERMOPLASTICS

[76] Inventor: Paul O. Sorkoram, 63412 M66, Sturgis, Mich. 49091

[21] Appl. No.: 154,785

[22] Filed: Feb. 26, 1988

Related U.S. Application Data

[63] Continuation-in-part of Ser. No. 26,536, Mar. 16, 1987.

[51] Int. Cl.$^4$ .................... B29D 11/00; B32B 31/12; B44C 3/02
[52] U.S. Cl. .................... 156/63; 219/121.67; 219/121.72; 219/121.82; 364/474.08; 264/1.4; 264/1.9; 264/25; 264/101; 264/139; 264/152; 264/245; 425/142; 425/174.4; 427/248.1
[58] Field of Search .................... 264/1.4, 1.7, 1.9, 25, 264/40.1, 101, 102, 132, 139, 152, 163, 245, 246, 247; 425/135, 142, 164, 174.4, 289, 295; 427/248.1; 364/167, 168, 475; 219/121.67, 121.72, 121.82; 156/63

[56] References Cited

U.S. PATENT DOCUMENTS

| | | | |
|---|---|---|---|
| 3,463,653 | 8/1969 | Letter | 264/245 X |
| 4,285,754 | 8/1981 | DiMatteo | 264/152 X |
| 4,307,047 | 12/1981 | Edinger et al. | 264/25 |
| 4,339,400 | 7/1982 | Sorkoram | 264/1.9 |
| 4,412,120 | 10/1983 | Duruz et al. | 219/121.67 |
| 4,639,572 | 1/1987 | Gruzman et al. | 219/121.67 |
| 4,680,442 | 7/1987 | Bauer et al. | 219/121.67 |
| 4,710,330 | 12/1987 | Lewandowski et al. | 264/25 |

FOREIGN PATENT DOCUMENTS

| | | | |
|---|---|---|---|
| 3324480 | 1/1985 | Fed. Rep. of Germany | 264/152 |
| 53-112976 | 10/1978 | Japan | 264/152 |
| 53-112977 | 10/1978 | Japan | 264/152 |
| 54-117576 | 9/1979 | Japan | 264/139 |
| 59-206192 | 11/1984 | Japan | 219/121.72 |

*Primary Examiner*—Jeffery Thurlow
*Assistant Examiner*—Leo B. Tentoni
*Attorney, Agent, or Firm*—Krass & Young

[57] ABSTRACT

The invention is both a method and apparatus for cutting thermoplastic materials in an aesthetically pleasing fashion. A laser is used to cut a preselected pattern in a thermoplastic material, resulting in a removable cutting being created, which is extracted from the material. Using a contrasting color of thermoplastic material, an identical laser cutting is made. The cutting from the first laser cutting operation is mated to the cavity created by the second laser cutting operation, resulting in a mosaic-type thermoplastic material which is pleasing to the eye. To ensure that the by-products of combustion from the laser cutting do not contaminate the heat-sensitive surfaces of the thermoplastic material, a directed source of vacuum is applied to the cutting table to ensure by-products of combustion are directed away from the cutting field.

8 Claims, 2 Drawing Sheets

METHOD AND APPARATUS FOR PATTERNED CUT OF THERMOPLASTICS

RELATED APPLICATION

This is a continuation-in-part of application Ser. No. 026,536, currently pending.

FIELD OF THE INVENTION

This invention is related to intricately patterned thermoplastic materials and to methods of producing such patterns using numerically controlled laser cutting.

PRIOR ART

Normally, inlaid patterns in thermoplastics are made by typical mosaic processes, including using either a die or preprinted pattern form to punch or cut a shape or pattern in the material. Adhesives are then used to secure the pieces together. In a variety of solid materials, particularly thermoplastics, the conventional methods for creating such patterns are expensive and time consuming. Further, because such processes are manually controlled and use conventional cutting equipment, the boundaries between the surrounding and inlaid materials are imprecise. Further, conventional cutting techniques create a rough, unpolished edge on the pieces to be assembled, which creates visual irregularities in transparent or semitransparent materials. Additionally, because of the high levels of thermal energy present in the laser cutting process, and the sensitivity of most thermoplastics to high levels of heat, burning, scorching and deformation of the cut edge, as well as the surfaces of the thermoplastic material, are common although undesirable, side effects of the laser cutting process. Current technology teaches the use of a variety of methods of cooling or protecting the surface of the thermoplastic, none of which have been satisfactory. Further, attempts to apply conventional cutting techniques to highly polished or mirrored thermoplastic surfaces have universally met with failure, where laser cutting techniques are used, because of the high reflectivity of the polished or mirrored surface. The present invention overcomes all of the foregoing limitations.

SUMMARY OF THE INVENTION

The present invention provides a novel method of manufacture and assembly of multiple thermoplastic transparent materials. A desired pattern of the finished materials is translated to a set of instructions, which are suitable for operating a numerically controlled laser cutting device. The pattern so committed and translated forms the basis for a series of instructions to guide the cutting beam of the cutting tool, creating a precisely defined opening of desired size and shape in a thermoplastic material. The laser cutting involves melting the edges of the parts and after passage of the beam the cut edges solidify to present a polished surface.

A second identical cutting of a contrasting color, shade or hue of similar material, of the same or a different thickness, is used to produce a cutting which precisely matches in dimension the opening created by the first laser cut. The cutting produced by the second laser cut is then inserted into the matching cavity created by the first laser cut and the pieces are appropriately secured to a common backing layer.

To absorb the thermal energy and by-products of combustion generated by the laser cutting tool, the method utilizes a honeycombed substrate material at the base of the cutting table, with the honeycomb chambers so oriented so as to create a series of cavities under the material to be cut. The depth of these cavities is regulated so as to allow the by-products of combustion in the laser cutting process to be directed away from the thermoplastic material being cut. The utilization of a combined vacuum and directed source of cooling gases, together with an energy absorbing surface material on the honeycomb, protects the thermoplastic material so as to eliminate deformation, burning and scorching of the cut edge of the thermoplastic material.

DESCRIPTION OF THE PREFERRED EMBODIMENT

Figure 1:
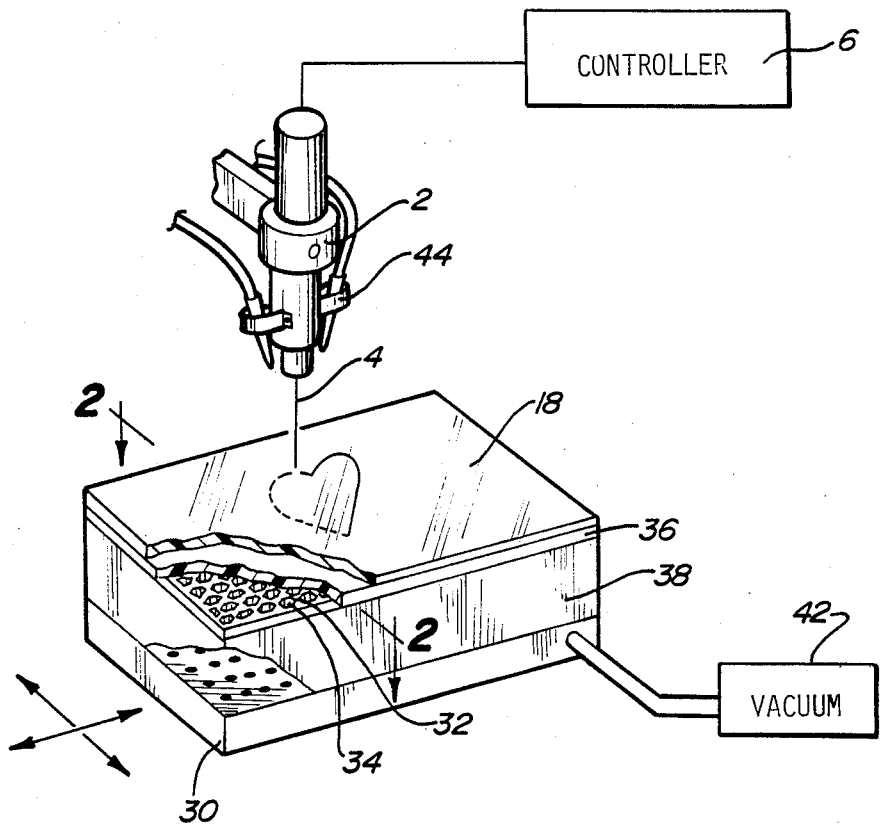
FIG. 1 shows, in stylized form, the laser cutting of the transparent material.
Figure 4:
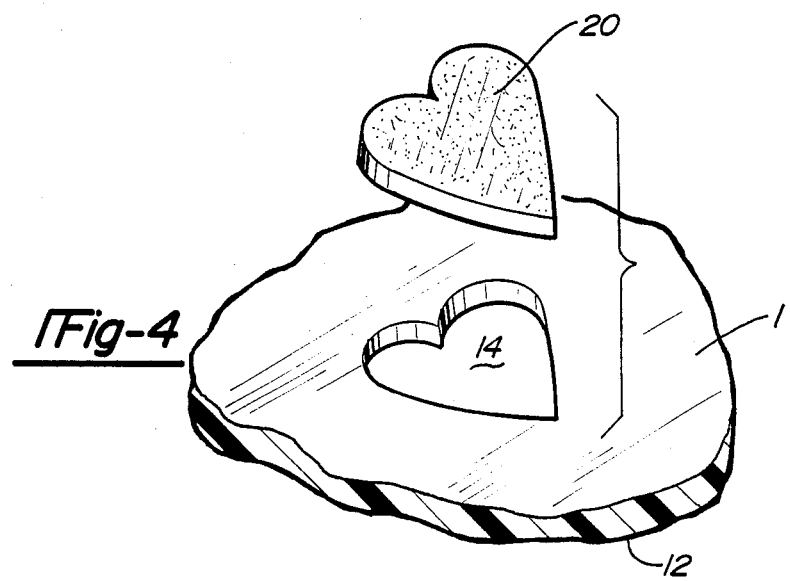
FIG. 4 shows, in perspective view, the assembly of the cutting t the cavity.

Referring now to FIG. 1, a numerical controller 6 serves to operate a laser cutting tool 2. In one embodiment of the invention, the laser cutting tool 2 is a continuous wave carbon dioxide laser of a type commercially used for cutting applications which produces a high energy output of between 250 and 400 watts. The cutting beam 4 is focused through a conventional laser lens, and the focused beam thereby created exhibits excellent cutting properties. This cut results in the production of cavity 14 within material 1 (see FIG. 4).

Figure 3:
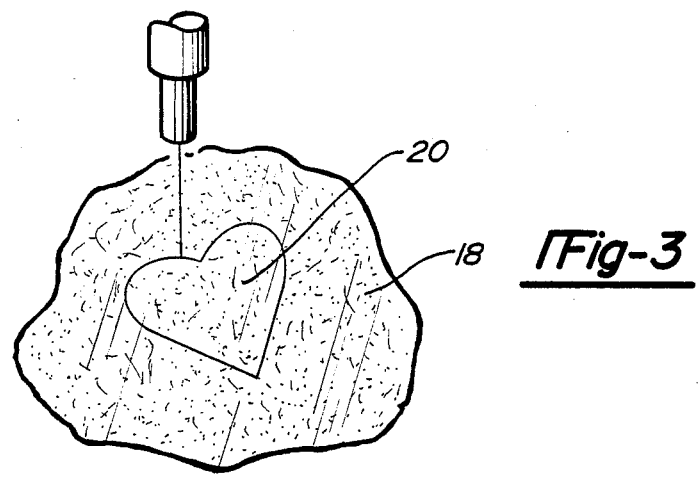
FIG. 3 shows a similar cutting of the second material.

Referring now to FIG. 3, a similar process is followed to create a second, identical cut in a sheet of thermoplastic material of contrasting composition, color, or both. The energized laser is utilized to cut a material 18 preferably of acrylic in a predetermined pattern. The laser cut helps to produce a highly polished and reflective appearance to the edge of the cut, and results in a cutting 20 being removable from the material 18.

In the preferred embodiment of the invention, both the first said material 1 and the second said material 18 are coated, on one surface, with a reflective coating 12. This reflective coating is typically applied by vapor deposition, creating a mirrored appearance to the material. It can be seen that the cutting 20 is of such dimension, having been formed from the same numerically controlled laser cutting tool 2, using an identical pattern, so as to allow a precise fit in the cavity 14 created in the first material 1. Referring again to FIGS. 3 and 4, it can also be seen that y virtue of the unique properties of the laser cutting equipment as well as the unique properties of the thermoplastics, the cut at the edge of the respective cuts creating the cavity 14 and the cutting 20 is highly polished and uniform. Additionally, because of the utilization of the same numerically controlled laser cutting tool 2 patterns, the fit between the cutting 20 and the cavity 14 can be made to be extremely precise and snug.

Referring again to FIG. 4, the cutting 20 is inserted into the cavity 14. In the preferred embodiment, the thicknesses of the materials used for the creation of the cavity 14 and the cutting 20 are identical. In alternative embodiments of the invention, sections of different thickness may be used, creating a three-dimensional effect.

Figure 5:
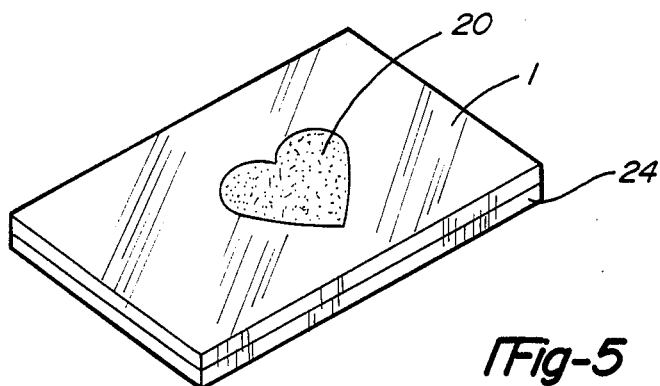
FIG. 5 shows the completed product.

The cutting 20 and the cavity 14 containing the cutting are secured together, and the resulting thermoplastic material sheet comprises a continuous surface, wherein the cutting created by the process is in contrast to the apparent background. The overall effect is of a pleasing mirrored surface which can take a wide variety of forms, and one of which the fit between the respective pieces is precise and aesthetically pleasing. No adhesive is necessary along the abutting edges. However, if desired, the assembled material 1 including the cutting 20 may be mounted on a substrate 24 using water-based adhesives which will not deleteriously affect the reflective layer. The reflective layer masks the adhesive from view. The completed product appears in FIG. 5.

Another variation in the apparatus and method contemplates the utilization of both of the original materials 1 and 18 and both of the cuttings 20. Each process of manufacture for one complete assembly creates the raw materials for the complementary portion of a second such assembly. Moreover, in manufacture of either symmetric or asymmetric patterns, the completed patterns consisting of two assembled units of first material and second material insert may be joined together in back-to-back fashion thereby creating a double sided pattern, whereby the pattern on one side consists of background color A and pattern color B, and the opposite side consists of background color B and pattern color A.

Because the laser cutting tool 2 generates the high temperatures typically required to vaporize thermoplastics, a number of steps are taken to insure that the process does not result in a burn, scorched, or deformed thermoplastic material. The pattern to be created in the thermoplastic materials, and 18 is derived from the programmed coordinates stored in a numerical controller 6. The instructions transmitted to the numerical controller 6 are converted by the controller 6 into commands to displace the entire cutting table in both the X and Y axes. The table itself also serves as the mounting surface on which the thermoplastic material is secured during the cutting process.

Figure 2:
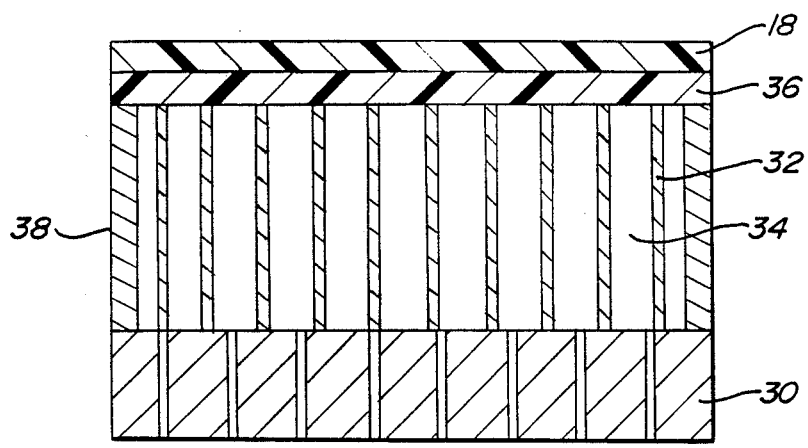
FIG. 2 shows a side, cut-away view across section 2—2 of the vacuum table, honeycomb material, thermal barrier and thermoplastic material.

With reference to FIGS. 1 and 2, the table itself consists of a vacuum table 30 connected to actuators driven by the numerical controller 6. The entire table moves on a series of bearing surfaces, and the position of the table is precisely controlled in position by the numerical controller to insure a high degree of repeatability in the manufacture of patterned thermoplastics. A honeycombed substrate 32 is securely mounted to the table. The upper surface of the substrate is generally planar, and a top view of the substrate reveals multiple openings 34, the vertical central axes of which are more or less parallel to the vertical axes of the laser beam. The honeycombed material may vary in overall thickness depending on the output of the laser measured in watts, the thickness of the material being cut and the physical properties of the material being cut. In the preferred embodiment utilized for the cutting of thermoplastics, the honeycombed substrate 32 is between two and three inches in overall thickness measured between its upper surface and lower surface when viewed in elevation. The approximate size of the chambers 34 of the honeycombed substrate 32 are approximately one-inch diameters, however, somewhat larger and somewhat smaller dimensions also function in a satisfactory fashion. A frame 38 surrounds the honeycombed substrate 32.

The upper surface of the honeycombed substrate 32 is covered with a rigid, thermal energy absorbent material 36, such as masonite, cardboard, or particle board. Masonite has desirable qualities, particularly, high thermal energy absorbing characteristics and fire resistance. The thermal energy absorbent material 36 is removably secured to the honeycombed substrate 32 and a table frame, typically through the use of wide adhesive tapes at the perimeter.

In the preferred embodiment of the method disclosed herein, the combined vacuum table 30, honeycombed substrate 32 and thermal energy absorbent material 36 are substantially sealed, creating a plenum bounded on the sides by the frame 38 surrounding the honeycombed substrate 32, on the bottom by the vacuum table 30 surface, and on the top by the thermal energy absorbent material 36. Because the honeycombed substrate 32 is manufactured to somewhat loose tolerances, openings remain throughout the closed plenum so described, at both the top and the bottom of the honeycombed substrate 32. Additionally, the honeycombed substrate 32 may be perforated between the various honeycomb chambers, and the honeycomb substrate 32 may be mounted on a separate perforated plenum. A vacuum source 42 is connected to the plenum first above described, or in the alternative, to the perforated plenum, thereby causing the atmospheric pressure within the first above-described plenum to be lower than the surrounding atmosphere during the cutting operation. In addition, sources of high pressure cooling gases 44 are disposed around the lens of the laser, and directed toward the thermoplastic material, creating a high pressure area above the surface of the thermoplastic material during cutting.

The preliminary step in the operation of the method herein described is the cutting of the desired pattern in the thermal energy absorbent material 36 itself. The pattern to be inscribed in the thermoplastic is transmitted by the numerical controller 6 to the actuators driving the vacuum table 30. The combination table, honeycombed substrate 32 and thermal energy absorbing material 36 moves, as a unit, under the laser cutting tool 2, thereby creating a through and through cut of the thermal energy absorbent material 36 in the precise pattern to be generated in the thermoplastic material. This cut creates a specific opening through which the vacuum created in the plenum and the high pressure air directed around the laser lens serve to force the products of combustion into the cavities 34 in the honeycombed substrate 32. The area of the thermal energy absorbent material 36 not cut by the laser beam acts as a thermal barrier, preventing the byproducts of combustion and thermal energy which are directed into the honeycombed 32 substrate from being reflected back onto the surface of the thermoplastic material being cut. The positive flow of cooling gases from about the lens, atmospheric gases from the normal atmospheric pressure surrounding the cutting process, and the vacuum created in the plenum serve to insure a more or less continuous flow of gases from the surface of the cutting table to the interior of the plenum, thereby simultaneously restricting the backflow of hot gases and combustion by-products, accordingly protecting the thermoplastic material from excessively high amounts of energy. The technique is so efficient that thermoplastics of thickness of up to one inch may be successfully cut without significant degradation of the quality of the cut edges of the thermoplastic material.

Having thus described my invention, what is claimed is:

1. An apparatus for cutting material with a focused laser beam comprising:
   (A) a numerical controller;
   (B) a movable table operated by said numerical controller in spatial relationship to the focused laser beam;
   (C) a multi-chambered substrate mounted on said table having upper and lower opposed surfaces;
   (D) a thermal energy absorbing material having a lower surface mounted on the upper surface of said substrate and an upper opposed surface upon which the material to be cut is mounted;
   (E) a source of high pressure gases directed toward the point of focus of the focused laser beam;
   (F) a source of vacuum;
   (G) means for applying said vacuum to each chamber of said multi-chambered substrate; and
   (H) means underneath said material being cut for connecting said vacuum to point of focus of said focused layer beam.

2. A method of patterned cutting of a substantially planar sheet of thermoplastic material comprising the steps of:
   (A) disposing the sheet of thermoplastic material on a sheet of thermal energy absorbing material;
   (B) numerically controlling a point of focus of a laser cutting beam in spatial relationship to the sheet of thermoplastic material for forming the patterned cutting;
   (C) directing a source of high pressure cooling gases toward the point of focus of the laser cutting beam; and
   (D) applying a vacuum to one side of the sheet of thermal energy absorbing material opposite the sheet of thermoplastic material;
   whereby said source of high pressure cooling gas and said vacuum remove hot gases and combustion products from the point of focus of the laser cutting beam and said sheet of thermal energy absorbing material remote from the point of focus of the laser cutting beam from heat build up, thereby protecting the cut in the sheet of thermoplastic material from deterioration during the patterned cutting.

3. The method of patterned cutting of a substantially planar sheet of thermoplastic material as claimed in claim 2, wherein:
   said step of (D) applying a vacuum to one side of the sheet for thermal energy absorbing material opposite the sheet of thermoplastic material includes
      (a) forming a cutting in the sheet of thermal energy absorbing material corresponding to the patterned cutting to be formed in the sheet of thermoplastic material,
      (b) disposing the sheet of thermal energy absorbing material on one side of a multi-chambered substrate having chambers which run perpendicular to the planar sheet of thermoplastic material, and
      (c) applying the vacuum to the side of the multi-chambered substrate opposite the sheet of thermal energy absorbing material.

4. A method of constructing a patterned mirror comprising the steps of:
   (A) disposing a layer of optically reflective material disposed on one surface of a first sheet of a first optically transparent thermoplastic material of a first color;
   (B) forming a patterned cutting in the first sheet of the first thermoplastic material thereby forming at least one cutting and corresponding cavity within the first sheet with substantially vertical side walls, said side walls having a smooth and optically reflective surface;
   (C) disposing a layer of optically reflective material disposed on one surface of a second sheet of a second optically transparent thermoplastic material of a second color contrasting with the first color;
   (D) forming the patterned cutting in the second sheet of the second thermoplastic material thereby forming a cutting corresponding to each cutting in the first sheet of the first thermoplastic material and a cavity corresponding to teach cavity of the first sheet of the first thermoplastic material with substantially vertical side walls, said side walls having a smooth and optically reflective surface; and
   (E) disposing each cutting of the second sheet of the second thermoplastic material within the corresponding cavity of said first sheet of the first thermoplastic material with surface of each cutting of the second sheet having the layer of optically reflective material disposed within the same plane as the surface of the first sheet having the layer of optically reflective material, thereby forming a patterned mirror with a background of the first thermoplastic material and a foreground of the second thermoplastic material.

5. The method of constructing a patterned mirror as claimed in claim 4, wherein:
   said steps of (B) forming a pattern cutting in the first sheet of the first thermoplastic material and (D) forming a patterned cutting in the second sheet of the second thermoplastic material each include
      (a) disposing the sheet of thermoplastic material on a sheet of thermal energy absorbing material,
      (b) numerically controlling a point of focus of a laser cutting beam in spatial relationship to the sheet of thermoplastic material for forming the patterned cutting,
      (c) directing a source of high pressure cooling gases toward the point of focus of the laser cutting beam, and
      (d) applying a vacuum to one side of the sheet of thermal energy absorbing material opposite the thermoplastic;
   whereby said source of high pressure cooling gas and said vacuum remove hot gases and combustion products from the point of focus of the laser cutting beam and said sheet of thermal energy absorbing material protects portions of the sheet of thermoplastic material remote from the point of focus of the laser cutting beam from heat build up, thereby protecting the cut in the sheet of thermoplastic material from deterioration during the patterned cutting.

6. The method of constructing a patterned mirror as claimed in claim 5, wherein:
   said step of (d) applying a vacuum to one side of the sheet of thermal energy absorbing material opposite the sheet of thermoplastic material includes
      (i) forming a cutting in the sheet of thermal energy absorbing material corresponding to the patterned cutting to be formed in the sheet of thermoplastic material, (ii) disposing the sheet of thermal energy absorbing material on one side of a multi-chambered substrate having chambers which run perpendicular to the planar sheet of thermoplastic material, and (iii) applying the vacuum to the side of the multi-chambered substrate opposite the sheet of thermal energy absorbing material.

7. The method of constructing a patterned mirror as claimed in claim 4, wherein:

said step of (E) disposing each cutting of the second sheet of the second thermoplastic material within the corresponding cavity of said first sheet of the first thermoplastic material includes (a) disposing an adhesive on the layer of optically reflective material disposed on one surface of the first sheet of the first thermoplastic material and each cutting of the second sheet of the second thermoplastic material, and (b) adhering the first sheet of the first thermoplastic material and each cutting of the second sheet of the second thermoplastic material to a common substrate via the adhesive.

8. The method of constructing a patterned mirror as claimed in claim 4, further comprising the steps of:

(F) disposing each cutting of the first sheet of the first thermoplastic material within the corresponding cavity of the second sheet of the second thermoplastic material with the surface of each cutting of the first sheet having the layer of optically reflective material disposed within the same plane as the surface of the second sheet having the layer of optically reflective material, thereby forming an inverse patterned mirror with a background of the second thermoplastic material and a foreground of the first thermoplastic material; and (G) adhering the layer of optically reflective material of the patterned mirror to the layer of optically reflective material of the inverse patterned mirror, thereby forming a double sided patterned mirror.

* * * * *

UNITED STATES PATENT AND TRADEMARK OFFICE
CERTIFICATE OF CORRECTION

PATENT NO. : 4,851,061
DATED : July 25, 1989
INVENTOR(S) : Sorkoram

It is certified that error appears in the above-identified patent and that said Letters Patent is hereby corrected as shown below:

Column 2, line 21, "t" should be --to--.

Column 2, line 48, "coating is" should be --coating 12 is--.

Column 2, line 62, "2 patterns" should be --2 and patterns--.

Column 3, line 38, "materials and" should be --materials 1 and--.

Column 3, line 41, "the controller" should be --the numerical controller--. (2nd occurrence)

Column 3, line 51, "controller to " should be --controller 6 to--.

Column 6, line 25, "with surface" should be --with the surface--.

Signed and Sealed this

Seventeenth Day of July, 1990

Attest:

HARRY F. MANBECK, JR.

*Attesting Officer*      *Commissioner of Patents and Trademarks*